United States Patent
Letney et al.

(10) Patent No.: US 7,440,451 B2
(45) Date of Patent: Oct. 21, 2008

(54) GLOBAL INTERNET PROTOCOL PREFIX NUMBER MOBILITY

(75) Inventors: Gordon E Letney, Sumner, WA (US); John H Bender, Seattle, WA (US); Brian L Skeen, Orting, WA (US); Carlos M Montes, Marysville, WA (US); Andrew L Dul, Seattle, WA (US); Terry L Davis, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 952 days.

(21) Appl. No.: 10/826,070

(22) Filed: Apr. 16, 2004

(65) Prior Publication Data

US 2005/0232280 A1 Oct. 20, 2005

(51) Int. Cl.
*H04L 12/28* (2006.01)
*G06F 15/173* (2006.01)

(52) U.S. Cl. .................. 370/389; 370/392; 370/254; 370/401; 709/238; 709/242

(58) Field of Classification Search ............ None
See application file for complete search history.

(56) References Cited

U.S. PATENT DOCUMENTS

| | | | |
|---|---|---|---|
| 6,604,146 B1 | 8/2003 | Rempe et al. | |
| 6,643,274 B2 | 11/2003 | D'Annunzio | |
| 2003/0048786 A1* | 3/2003 | D'Annunzio | 370/392 |
| 2003/0182445 A1* | 9/2003 | Smith et al. | 709/238 |
| 2004/0010615 A1* | 1/2004 | Ernst et al. | 709/238 |
| 2004/0032852 A1* | 2/2004 | Thubert et al. | 370/349 |
| 2005/0099971 A1* | 5/2005 | Droms et al. | 370/328 |
| 2005/0169220 A1* | 8/2005 | Sreemanthula et al. | 370/338 |
| 2006/0050628 A1* | 3/2006 | Ng et al. | 370/216 |
| 2006/0080460 A1* | 4/2006 | Kobayashi et al. | 709/238 |

OTHER PUBLICATIONS

"Nemo Basic Support Protocol draft-ietf-nemo-basic-support-00. txt", V. Devarapalli, Jun. 21, 2003 (35 pgs).
"DHCPv6 Prefix Delegation for NEMO draft-droms-nemo-dhcpv6-pd-00.txt", R. Droms, Jun. 23, 2003 (7 pgs).
"Examples of basic Nemo usage draft-thubert-nemo-basic-usages-01", P. Thubert, Feb. 14, 2004 (20 pgs).

* cited by examiner

*Primary Examiner*—Wing F. Chan
*Assistant Examiner*—Robert C Scheibel
(74) *Attorney, Agent, or Firm*—Harness, Dickey & Pierce, P.L.C.

(57) ABSTRACT

A routing system operably links a mobile platform to the Internet. The system includes a ground based communications link manager linkable to the mobile platform. At least one ground based prefix server can communicate with the communications link manager. An initial Internet address is assigned to the mobile platform. A prefix server program communicates the initial destination address of the mobile platform to the communications link manager and to the Internet. During a travel segment of the mobile platform a new destination address can be communicated to the Internet using the prefix server to maintain communication between the mobile platform and the Internet.

35 Claims, 3 Drawing Sheets

GLOBAL INTERNET PROTOCOL PREFIX NUMBER MOBILITY

FIELD OF THE INVENTION

The present invention relates generally to the routing of Internet protocol (IP) packets and more specifically to a system and method for routing IP packets to/from a mobile platform where a contiguous network infrastructure may not be available.

BACKGROUND OF THE INVENTION

Common network routing protocols for the Internet assume that sub-networks each having one or more routers remain fixed or are maintaining a continuous connection to a network architecture. IP packets and necessary routing information are able to be transferred between autonomous systems by first establishing a communications link between at least the sending terminal and the receiving terminal having a plurality of data routers and sub-networks. An Internet routing protocol such as Border Gateway Protocol 4 (BGP-4) can be used to establish communications paths. A preferred routing path can be determined, for example using BGP-4 by assigning various preference attribute values to each available route and selecting the best route in a multi-step process.

Mobile platforms including for example aircraft, ships, trains, busses, automobiles, etc. (hereinafter referred to for simplicity as aircraft) can encounter difficulties with IP packet transfer because one or more of the sub-networks must either change as the aircraft changes location, or the preferred route must continuously change, which can result in "flapping" as line update messages continuously change as the preferred route changes. One common way to avoid flapping is to "backhaul" all data to the originating sub-network for transfer over the fixed path originally linked. This is often not the most efficient or cost effective way to transfer data.

U.S. Pat. No. 6,604,146 to Rempe et al., issued Aug. 5, 2003, discloses a centralized route-server architecture permitting Internet Protocol (IP) services to be offered over satellite mesh networks. The centralized route-server is implemented on a standard workstation. Routing information is only exchanged between a master terminal and each other terminal in the network. If a connection does not exist to the destination terminal or increased bandwidth is required for the destination terminal, the entry terminal must make a request to the master terminal for a satellite connection or (temporarily) increased bandwidth. If the destination terminal is a moving platform, all routing information must backflow through the master terminal and IP packets are held up pending confirmation of a new route. No allowance is made for an Internet address which changes during a travel segment of a mobile platform.

SUMMARY OF THE INVENTION

According to a preferred embodiment of the present invention, a global Internet protocol prefix number mobility system operable to link a mobile platform to the Internet includes a ground based communications link manager communicatively linkable to the mobile platform. At least one ground based prefix server is in operable communication with the communications link manager. An initial address is assignable to the mobile platform. A prefix server program is operable to communicate the initial Internet address of the mobile platform to the communications link manager and to the Internet.

According to yet another preferred embodiment of the present invention a method for maintaining communications contact between a mobile platform and the Internet during a travel segment of the mobile platform using at least one ground based communications link manager includes: creating at least one ground based prefix server operable to communicatively link the mobile platform and the communications link manager; programming the prefix server to operatively select a prefix number for the mobile platform from a plurality of prefix numbers; assigning the prefix number to the mobile platform for the travel segment; and signaling via the prefix server a destination address of the mobile platform using the prefix number communicated via the communications link manager.

A global Internet protocol prefix number mobility system of the present invention provides several advantages. By locating the prefix server of the present invention adjacent to or within the ground based communications link manager, system hardware or software to perform the functions of the prefix server can be removed from the mobile platform and positioned in the ground based portion of the flow path to the Internet. This can reduce mobile platform complexity and cost and permit limited numbers of prefix servers to serve a fleet of mobile platforms. By assigning prefix numbers to a mobile platform using a prefix server of the present invention, a local pool of prefix numbers can be retained. The use of a prefix server can reduce the total number of prefixes required to serve the fleet of aircraft by performing prefix management functions. A travel segment for the mobile platform can be provided with Internet access while permitting switching of the prefix number between communications links during travel if necessary.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
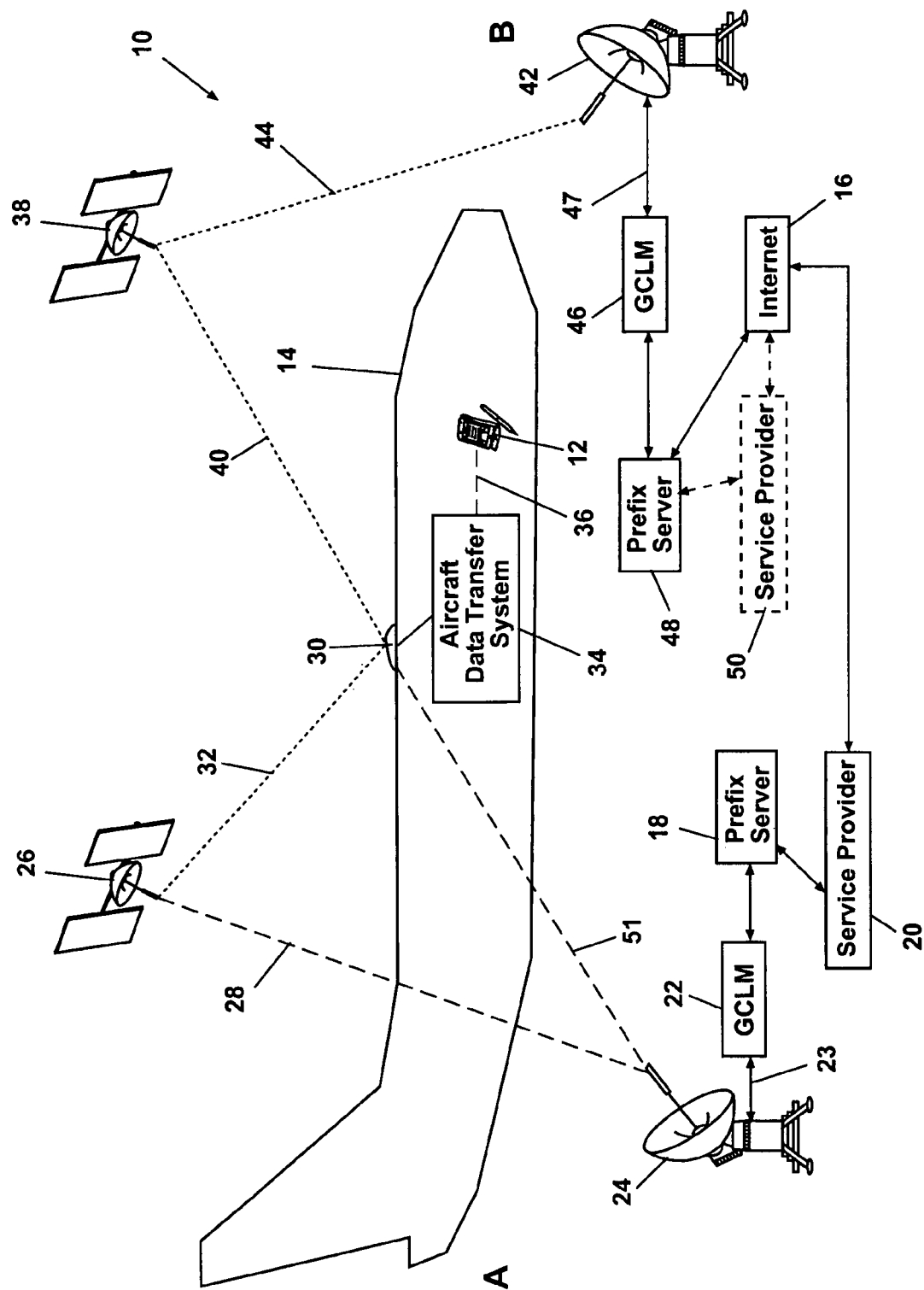
FIG. 1 is a diagrammatic view of a global Internet protocol prefix number mobility system according to a preferred embodiment of the present invention.

According to a preferred embodiment of the present invention, and referring generally to FIG. 1, a mobile routing system 10 of the present invention can include a user electronic device 12 positioned on a mobile platform such as an aircraft 14. Internet 16 can be provided with a communication path to user electronic device 12 using a prefix server 18 of the present invention.

To communicate with the Internet 16, user electronic device 12 can be connected via one or more Internet service providers (ISP) 20 connectable to prefix server 18. Prefix server 18 can be in turn connectable to a ground based communication link manager (GCLM) 22. GCLM 22 can communicate via a two-way communication path 23 to a ground based transmitter/receiver (GBT/R) 24. GBT/R 24 can transmit electronic signals to and from a communications satellite 26 via a signal path 28. These electronic signals can be communicable to an antenna 30 of aircraft 14 via a satellite/aircraft communication path 32. Within aircraft 14 communications signals can be transferred to and from an aircraft data transfer system 34 which can transfer or receive signals to/from user electronic device 12 via a signal path 36. Signal path 36 can be a hard wired signal path or a radio frequency signal path.

During a travel segment of aircraft 14, herein defined as a flight originating at a point "A" and ending at a point "B", communication between user electronic device 12 and the Internet 16 can be substantially provided by communications satellite 26. During at least a portion of the travel segment, communication path 32 may be interrupted or broken due to inability of antenna 30 to receive or transmit signals to or from communications satellite 26. During this condition, a new communications path can be opened between antenna 30 of aircraft 14 and Internet 16. This can be accomplished by transferring signals to or from antenna 30 and a communication satellite 38 via a satellite/aircraft communication path 40. From communication satellite 38 signals can be transferred to and from a GBT/R 42 via a communication path 44. GBT/R 42 can be in turn connected to a GCLM 46 via a two-way communication path 47. GCLM 46 can be connected to a prefix server 48 which can directly communicate with Internet 16 or alternately can communicate with Internet 16 via one or more Internet service provider(s) 50 (shown in phantom). Either GBT/R 24 or GBT/R 42 can also communicate directly with aircraft 14, for example via a direct communication path 51. Direct communication path 51 can be used for example when aircraft 14 is preparing for take-off or when aircraft 14 has landed.

Figure 2:
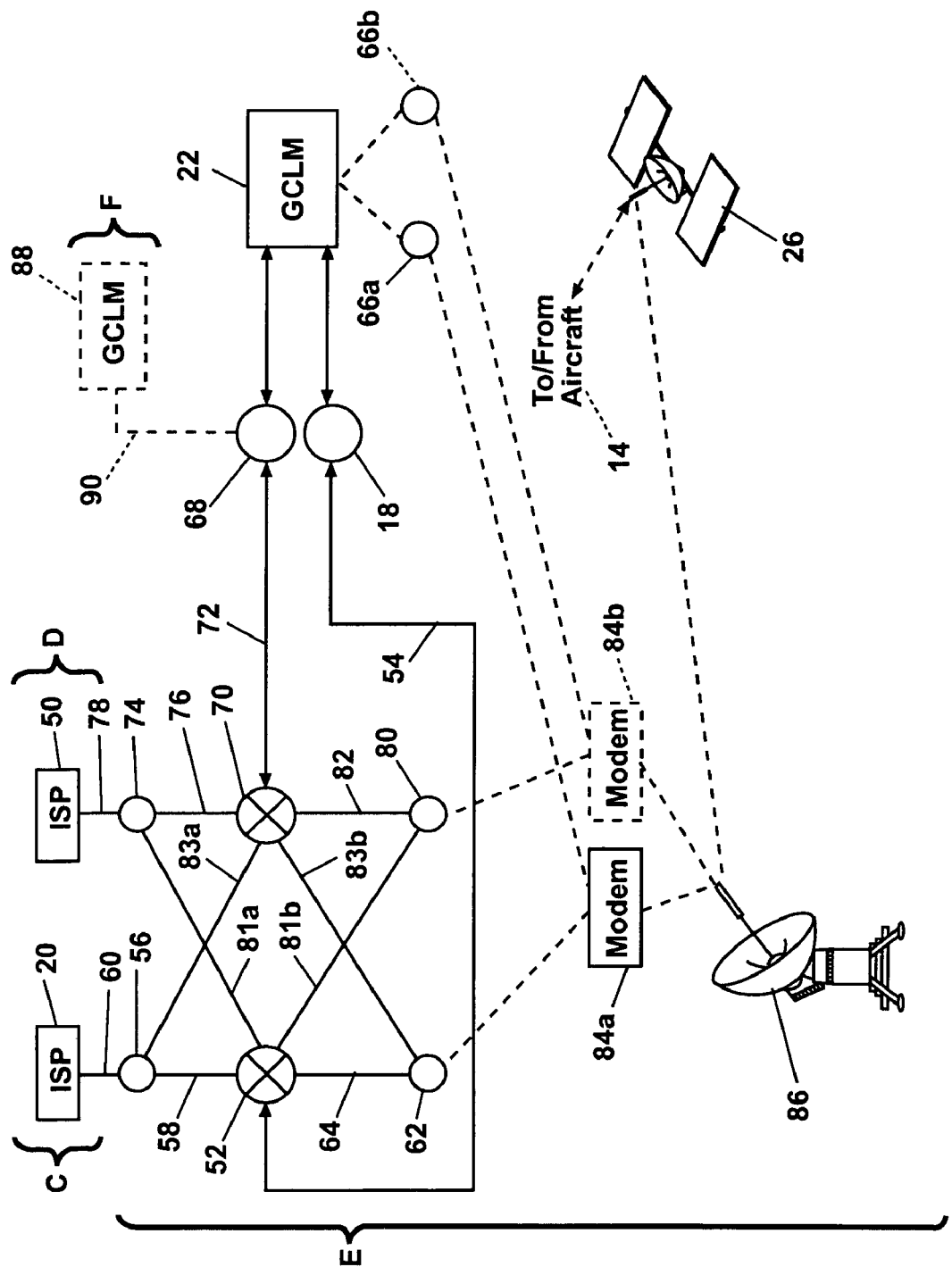
FIG. 2 is a diagrammatic view showing exemplary Internet system connections for prefix servers of the present invention.

Referring generally to FIG. 2, an exemplary functional connection to prefix servers of the present invention is illustrated. Prefix server 18 can be connected between GCLM 22 and a route reflector 52 via an internal BGP connection 54. Route reflector 52 can be in turn connected to a router 56 via an internal BGP connection 58. Router 56 can be connected to ISP 20 via an external BGP connection 60. Additional external connection for signals transferred to and from route reflector 52 can be via a router 62 connected to route reflector 52 via an internal BGP connection 64. Communication signals from GCLM 22 can be transferred to or from communications satellite 26 via a first router 66a connected to a modem 84a associated with a GBT/R 86. A second router 66b connected to modem 84b associated with GBT/R 86 can also provide a signal transfer path from GCLM 22 to and from communication satellite 26.

A second prefix server 68 can transfer communication signals between GCLM 22 and a route reflector 70 via an internal BGP connection 72. A router 74 can be connected to route reflector 70 via an internal BGP connection 76. Router 74 is in turn connectable to ISP 50 via an external BGP connection 78.

ISP 20 forms a first autonomous system "C". ISP 50 forms a second autonomous system "D". A router 80 can be connected to route reflector 70 via an internal BGP connection 82. Each of the routers and route reflectors identified in FIG. 2 are commonly known in the art. Devices 18, 52, 56, 62, 66a, 66b, 68, 70, 74, and 80 can form an autonomous system "E". Each route reflector 52,70 can be cross connected to opposing auxiliary system routers. Connections 60, 78 permit communications between the Internet and the ground based network system. The external BGP connections 60, 78 permit various routes to be formed between the ground based network system, such as autonomous system "E", Internet service providers (20 or 50), and the Internet 16.

Each of router 62 and router 80 can communicate with modem 84a and modem 84b, respectively. Modem 84a and modem 84b both in turn can communicate with a GBT/R 86. GBT/R 86 can provide an alternate communication path to Internet 16 as commonly known. Modem 84a and modem 84b are exemplary of a plurality of modems which can be linked to GBT/R 86 from additional autonomous systems (not shown).

Prefix server 68 can also be connected to a GCLM 88 via an IP traffic tunnel path 90 which may exist within an autonomous system "F". IP tunnel connections are commonly known and can provide global connectivity between individual IP networks.

Figure 3:
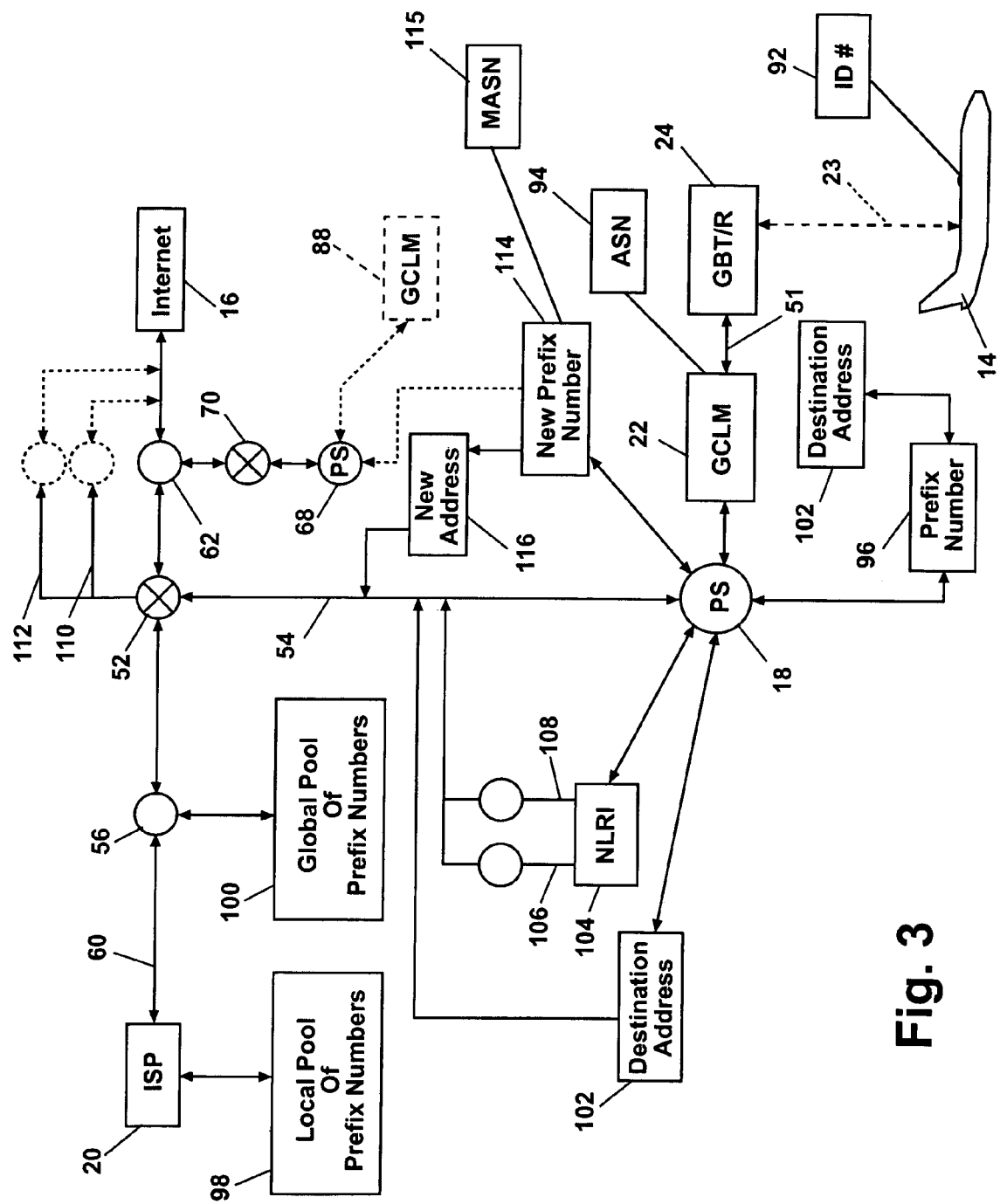
FIG. 3 is a diagrammatic view showing communication and data flow paths of a mobile routing system according to a preferred embodiment of the present invention.

Referring generally to FIG. 3, basic functions of a prefix server of the present invention are shown. In this example, prefix server 18 can communicate between ISP 20 and aircraft 14. Initially, each aircraft 14 can be provided with an aircraft unique identification number 92. GCLM 22, prefix server 18, route reflector 52, and router 56 can be provided with an autonomous system number 94. When aircraft 14 initiates the travel segment, a prefix number 96 can be selected from one of at least two sources using prefix server 18. Each autonomous system such as autonomous system "E" can be assigned a local pool of prefix numbers. In this example autonomous system "E" is assigned a local pool of prefix numbers 98. Local pool 98 is initially empty and is provided with each of its plurality of prefix numbers generally at the completion of individual travel segments of aircraft 14 or additional aircraft (not shown). Local pool 98 includes a volume allowing a predetermined number or limit of prefix numbers associated with it. If local pool 98 is empty of prefix numbers, prefix server 18 can next search a global pool 100 of prefix numbers. Global pool 100 can provide a plurality of prefix numbers available from a plurality of autonomous systems. After selecting prefix number 96 from either local pool 98 or global pool 100, prefix server 18 can map the prefix number 96 against the unique identification number 92 of aircraft 14 to a local destination address 102 for aircraft 14. Destination address 102 can be subsequently identified by prefix server 18 as an available site to each of the plurality of autonomous systems which form a possible path of communications of data to or from aircraft 14 and Internet 16 via internal BGP connection 54. If two-way communication path 23 is open, a plurality of route data in the form of network layer reachability information (NLRI) 104 can be transmitted to the plurality of autonomous systems via a plurality of route paths. As known in the art, network layer reachability information can include for example information such as "NEXT_HOP", "UPDATE", "KEEP ALIVE", "LOCAL_PREF", "AS_PATH" and "NOTIFICATION" messages. The plurality of route paths can include a first route path 106, a second route path 108, a third route path 110 connected to Internet 16, and a fourth route path 112 connected to Internet 16. These route paths are exemplary and are indicative of possible route paths for NLRI 104.

A mobile autonomous system number (MASN) 115 may also be linked to prefix number 96. Prefix server 18 uses the MASN 115 to modify NLRI 104. Some forms of border gateway protocol may require the originating autonomous system number for a prefix to be generally static in nature. MASN 115 provides the prefix server information to modify the AS_PATH to allow for Internet Service Provider 20 to authenticate and authorize the propagation of NLRI information throughout the Internet 16. The use of MASN 115 also allows prefix server 18 to aggregate a plurality of routes within Local Pool 98 to reduce the need to propagate an exact NLRI to the Internet 16 for each prefix number 96. The use of an aggregate NLRI using MASN 115 also provides for the ability to insert a single NLRI covering all routes within Local Pool 98. A single large prefix number may be preferable by some Internet service providers.

In some cases it may be desirable to modify the assigned prefix number to an aircraft 14. Prefix server 18 can request a new prefix number 114 by first querying local pool 98 and subsequently querying global pool 100 if new prefix number 114 is not available from local pool 98. Similar to prefix number 96, new prefix number 114 can be mapped with unique identification number 92 to form a new destination address 116. Prior to transmission of new destination address 116, each of the open route paths including route paths 106, 108, 110, and 112 are closed by prefix server 18. New destination address 116 is then identified to the various autonomous systems by prefix server 18 and a plurality of new routes (not shown) are subsequently identified by prefix server 18 to transfer NLRI 104 via the newly open routes. Prefix server 18 returns prefix number 96 to either local pool 98 or global pool 100 when new prefix number 114 is withdrawn.

Upon completion of the travel segment (in this example from point "A" to point "B"), prefix number 96 (if still current) or new prefix number 114 are returned to local pool 98 if local pool 98 has not reached its maximum volume. If local pool 98 has reached its maximum volume, the prefix number (96 or 114) is returned to global pool 100. Returning prefix numbers as a first priority to local pool 98 reduces the possibility of external "route flapping" by maintaining the prefix numbers for immediate reuse by the associated autonomous system. It is therefore possible for aircraft 14 to reuse the prefix number just returned to local pool 98 upon initiation of a new travel segment, or another aircraft (not shown) can reuse the prefix number from local pool 98, thus reducing the need to pull prefix numbers from global pool 100.

When GCLM 22 can no longer communicate via two-way communication path 23 to aircraft 14, the handoff process from GCLM 22 to a subsequent GCLM (for example GCLM 46 shown in FIG. 1), includes steps in the following order. The GCLM at the new ground station (in this example GCLM 46) can notify GCLM 22 that unique identification number 92 is now available via a new destination address (for example 116). Prefix server 48 can then inject NLRI 104 as new NLRI via an internal BGP connection. GCLM 22 can then notify prefix server 18 that unique identification number 92 is no longer reachable. Prefix server 18 can then withdraw the original routes for NLRI 104. Border routers (for example routers 74 and 80 shown in FIG. 2) can receive the new NLRI from prefix server 48 (or prefix server 68) via IP tunneled connections such as 90. These border routers can announce the new NLRI to other routers (such as routers 56 to autonomous system "C") which reopens the connection for Internet service provider 20 between aircraft 14 and Internet 16.

On landing the following steps are taken. The active GCLM (GCLM 22, GCLM 46, or GCLM 88) can notify prefix server 18 of the landed status of aircraft 14. Prefix server 18 can return the prefix number (prefix number 96) to either local pool 98 or global pool 100. Prefix server 18 can then notify other prefix servers, such as prefix server 68 shown in FIG. 2, that unique identification number 92 mapping is now invalid.

Prefix servers of the present invention are computer programs performing the functions identified herein. Prefix server programming can be written using existing open source code such as GNU Zebra or other source code. Prefix servers of the present invention are also identified in terms using border gateway protocol 4 (BGP-4). The present invention is not limited to BGP-4 protocol. Other protocols can be used with modifications inherent to the protocol used which are known to a person of skill in the art.

A global Internet protocol prefix number mobility routing system of the present invention provides several advantages. By locating prefix servers of the present invention adjacent to or within the ground based communications link manager, system hardware or software performing the functions of the prefix server can be removed from the mobile platform and positioned in the ground based portion of the flow path to the Internet. This can reduce mobile platform complexity and cost and permit limited numbers of prefix servers to serve a fleet of mobile platforms. By assigning prefix numbers to a mobile platform using a prefix server of the present invention, a local pool of prefix numbers can be retained. Retaining these prefix numbers can reduce the potential for external route flapping. A system of the present invention makes use of existing protocols and does not require modifications to existing Internet infrastructure to support prefix number mobility of the system. A prefix server of the present invention acts as an internal BGP route server and a dynamic prefix assignment server. Prefix servers of the present invention are therefore capable of adding routes and setting NLRI data such as NEXT_HOP attributes as well as withdrawing routes when an active GCLM signals that the two-way communication path is no longer available.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A routing system operable to link a mobile platform to the Internet, comprising:
   a ground based communications link manager communicatively linkable to a first mobile platform;
   at least one ground based prefix server in operable communication with the communications link manager;
   an initial destination address assignable to the first mobile platform;
   a local prefix number pool operable to store a limited quantity of prefix numbers each received from any of a plurality of mobile platforms upon completion of a trip of any of the plurality of mobile platforms; and
   a prefix server program operable to select one of the limited quantity of prefix numbers from the local prefix number pool and communicate the initial destination address of the first mobile platform to the communications link manager and to the Internet.

2. The system of claim 1, wherein the initial destination address of the first mobile platform is assignable from the selected prefix number.

3. The system of claim 1, wherein the prefix server and the communications link manager are in operable communication with the Internet using a global border gateway protocol.

4. The system of claim 1, wherein the prefix server and the ground based communications manager are in operable communication with the Internet using at least one of a plurality of Internet service providers.

5. The system of claim 1, wherein a new destination address is communicable to the Internet using the prefix server during a travel segment of the first mobile platform.

6. The system of claim 5, wherein the new destination address is operatively communicable to the Internet using a second communications link manager.

7. A method for operating a mobile platform communications system prefix server, comprising:
storing in a local prefix number pool a plurality of prefix numbers received from any of a plurality of mobile platforms upon completion of a trip of any of the plurality of mobile platforms;
selecting a prefix number from the plurality of prefix numbers;
linking a mobile autonomous system number to the prefix number operable by the prefix server to aggregate a plurality of routes within the local prefix number pool;
linking the prefix number with the mobile autonomous system number to a mobile platform identification number;
linking the prefix number with the mobile autonomous system number to a mobile platform destination address; and
signaling to at least one Internet service provider the location of the mobile platform destination address.

8. The method of claim 7, further comprising:
adding data transfer routes between the mobile platform destination address and the at least one Internet service provider;
confirming if a two-way communications path is open between a mobile platform and a ground communications link manager; and
withdrawing the data transfer routes when the two-way communications path is broken.

9. The method of claim 7, further comprising positioning the prefix server as a ground based unit.

10. The method of claim 7, further comprising injecting a plurality of network layer reachability information into an internal border gateway protocol network.

11. The method of claim 7, further comprising notifying a plurality of route servers of the prefix number.

12. A method for maintaining communications contact between a mobile platform and the Internet during a travel segment of the mobile platform using at least one ground based communications link manager, the method comprising:
creating at least one ground based prefix server operable to communicatively link the mobile platform and the at least one communications link manager;
storing in an initially empty local prefix number pool a plurality of prefix numbers after use by a plurality of mobile platforms;
programming the prefix server to operatively select a one of the plurality of prefix numbers for the mobile platform from the local prefix number pool;
assigning the prefix number to the mobile platform for the travel segment; and
signaling via the prefix server a destination address of the mobile platform using the prefix number communicated via the at least one communications link manager.

13. The method of claim 12, further comprising:
selecting a new prefix number upon initiation of a new travel segment of the mobile platform;
creating a new destination address using the prefix server; and
signaling the new destination address using the prefix server during the new travel segment of the mobile platform to operatively maintain communication between the mobile platform and the Internet.

14. The method of claim 12, further comprising:
establishing a two-way communication path between the mobile platform and the at least one communications link manager; and
adding a plurality of route paths using the prefix server after the two-way communication is established.

15. The method of claim 14, further comprising withdrawing the route paths when the two-way communication ends.

16. The method of claim 12, further comprising mapping a unique aircraft identification number to the assigned prefix number using the prefix server.

17. The method of claim 12, further comprising injecting a plurality of network layer reachability information using the prefix server.

18. The method of claim 12, further comprising notifying a plurality of Internet route servers of the selected prefix number using the prefix server.

19. The method of claim 12, further comprising initially allocating the plurality of prefix numbers to a global pool of prefix numbers.

20. A method for maintaining communications contact between a mobile platform and the Internet during a travel segment of the mobile platform using at least one ground based communications link manager, the method comprising:
creating at least one ground based prefix server operable to communicatively link the mobile platform and the at least one communications link manager;
programming the prefix server to operatively select a prefix number for the mobile platform from a plurality of prefix numbers;
assigning the prefix number to the mobile platform for the travel segment;
signaling via the prefix server a destination address of the mobile platform using the prefix number communicated via the at least one communications link manager;
initially allocating the plurality of prefix numbers to a global pool of prefix numbers;
creating a local pool operable to contain a first portion of the plurality of prefix numbers; and
assigning the local pool to an autonomous system in operable communication with the Internet.

21. The method of claim 20, further comprising programming the prefix server to initially select the prefix number from the local pool.

22. The method of claim 21, further comprising programming the prefix server to operatively select the prefix number from the global pool if the local pool is empty.

23. The method of claim 20, further comprising programming the prefix server to add the prefix number to the local pool upon completion of the travel segment.

24. The method of claim 23, further comprising:
programming the prefix server to add the prefix number to the global pool only if the local pool is in a full condition; and
withdrawing a plurality of route paths operably forwarded by the prefix server only if the prefix number is added to the global pool.

25. A method for maintaining communications contact between a mobile platform and the Internet during a travel segment of the mobile platform using at least one ground based communications link manager, the method comprising:

creating at least one ground based prefix server operable to communicatively link the mobile platform and the at least one communications link manager;

programming the prefix server to operatively select a prefix number for the mobile platform from a plurality of prefix numbers for the travel segment of the mobile platform;

submitting a mobile platform request for the prefix number at the initiation of the travel segment;

assigning the prefix number to a mobile platform identification number; and operating the prefix server to signal a destination address of the mobile platform using the prefix number communicated via the at least one communications link manager.

26. The method of claim 25, further comprising:

establishing a two-way communication path between the mobile platform and the at least one communications link manager; and adding a first plurality of Internet route paths using the prefix server after the two-way communication is established.

27. The method of claim 26, further comprising withdrawing the first plurality of route paths when the two-way communication ends.

28. The method of claim 27, further comprising:

selecting a new prefix number during the travel segment of the mobile platform when the two-way communication ends; and creating a new destination address from the new prefix number using the prefix server.

29. The method of claim 28, further comprising:

establishing a new two-way communication path between the mobile platform and the at least one communications link manager;

signaling the new destination address using the prefix server during a new travel segment of the mobile platform to operatively maintain communication between the mobile platform and the Internet; and adding a second plurality of route paths using the prefix server.

30. The method of claim 25, further comprising notifying a plurality of Internet route servers of the selected prefix number using the prefix server.

31. The method of claim 25, further comprising programming the prefix server to operatively notify at least one other prefix server of the plurality of prefix servers that a mapping of a mobile platform identification number to a route is invalid at an end of the travel segment.

32. The method of claim 25, further comprising linking a mobile autonomous system number to the prefix number.

33. The method of claim 32, further comprising modifying a network layer reachability information message using the prefix server.

34. The method of claim 32, further comprising aggregating a plurality of route paths using the prefix server.

35. The method of claim 32, further comprising inserting a single network layer reachability information message for a plurality of route paths.

* * * * *